Jan. 14, 1936.                F. GEORGE                2,027,586
                    DECORATIVE MATERIAL AND ARTICLE
                         Filed Dec. 18, 1933
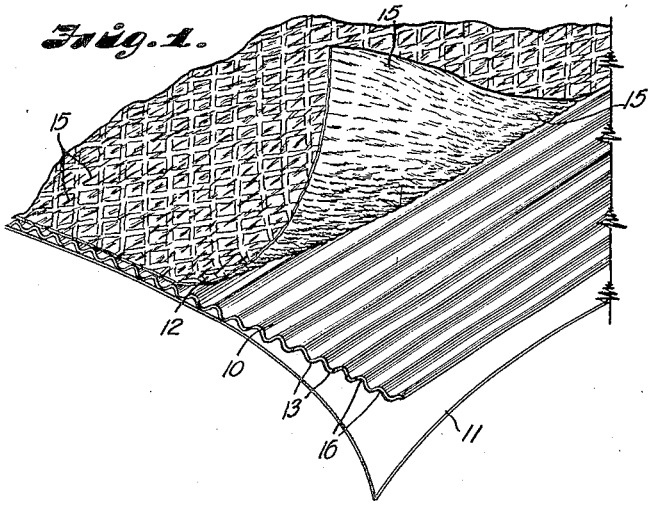
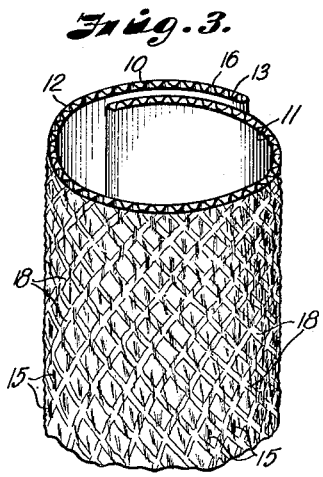
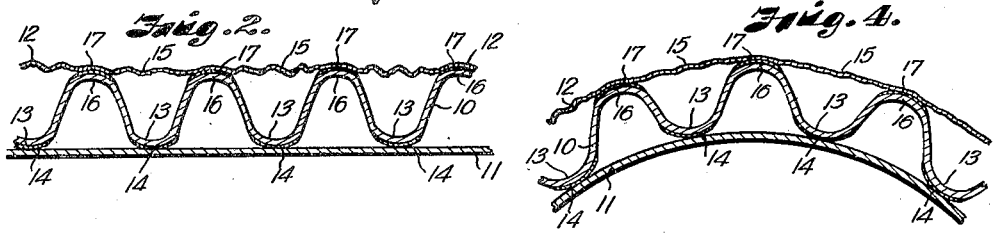
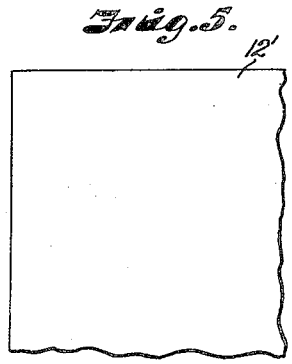
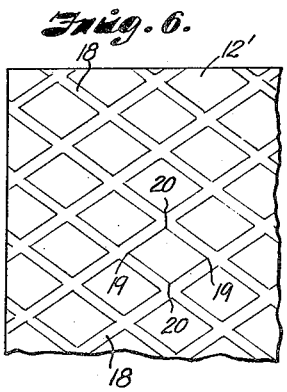
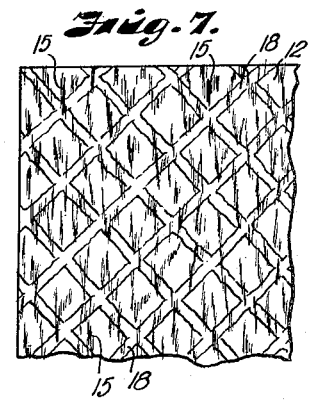
INVENTOR
Fred George
BY Alfred R. Fuchs
ATTORNEY

UNITED STATES PATENT OFFICE

2,027,586

DECORATIVE MATERIAL AND ARTICLE

Fred George, Sandusky, Ohio, assignor to The Hinde and Dauch Paper Company, Sandusky, Ohio, a corporation of Ohio Application December 18, 1933, Serial No. 703,026

12 Claims. (Cl. 154—55)

My invention relates to composite materials of a paper-like character, and more particularly to a composite material comprising a ply of crinkled paper-like material, and plies supporting the same in such a manner that the composite material can be bent into curved shapes without damage thereto, and my invention further relates to an article having a wall portion that is curved, and which comprises a ply of crinkled paper-like material, and other layers of material to provide a supporting means for the same in such curved condition. This is a continuation in part of my application for patent on Composite board, Serial No. 659,481, filed March 3, 1933.

It is a purpose of my invention to provide a material of the above mentioned character, which comprises an uncorrugated ply of fibrous material, such as paper or paste-board, or similar material, such as strawboard, for example, a ply of material of a similar character to the said uncorrugated ply, which is corrugated, said corrugated and uncorrugated plies being fixed in position at predetermined points relative to each other in the manner common to single faced corrugated board, and comprising a third ply, which is made of the crinkled paper-like material and which is secured to the corrugations of the corrugated ply at intervals in a similar manner to that of the previously mentioned uncorrugated ply.

It is a particular purpose of my invention to provide a material of the above mentioned character, which is provided with an uncorrugated ply that is made up of a paper-like material that is substantially non-extensible in all directions, and a corrugated ply of material of a similar character, and an uncorrugated ply of material that is extensible between certain limits in one direction, and substantially non-extensible in a direction at right angles thereto. Preferably, the extensibility of this material is obtained by crinkling the same so that it will have a predetermined extensibility, due to the straightening out of the crinkles, to a certain extent, in a direction transversely of the corrugations of the corrugated ply. To accomplish this the crinkles are formed substantially parallel to the corrugations, with a plurality thereof between each corrugation, or between each line or zone at which the crinkled sheet is secured to the corrugated sheet. The material made in this manner is of such a character that it can be bent on an axis of curvature that is parallel to the corrugations of the corrugated sheet, with the crinkled sheet on either the concave or the convex side of the sheet, as the crinkles will permit the crinkled ply or layer to not only extend in a direction such as to permit the curving of the sheet so that the crinkled layer will be on the convex side thereof, but the crinkles will also permit a more pronounced wrinkling of the crinkled ply, than that due to the crinkles themselves, when the crinkled ply is turned inwardly in the bending of the sheet, or is on the concave face thereof. The preferred manner of using the material, however, is to curve it so that the convex face of the material is that having the crinkled ply thereon.

It is a specific purpose of my invention to provide a decorative material that can be utilized either in a flat state or in a curved state, and which has a decorated face that is provided by means of a decorated crinkled paper-like material, which is backed and supported by means of corrugated and uncorrugated layers of relatively heavy paper-like material, such as strawboard, or similar material, that constitutes substantially a single faced corrugated board backing of the crinkled paper-like material. However, the crinkled paper-like material is united with the single faced corrugated board, so as to form a double faced board, which is not of the same characteristics as the usual double faced corrugated board, in that it can be curved or bent on an axis of curvature parallel to the direction or extent of the corrugations, which is not possible of a double faced corrugated board made with the two plain sheets thereof or flat sheets thereof, of non-extensible or substantially non-extensible fibrous material.

It is also an object of my invention to provide a new and improved decorative article, comprising a curved wall portion, which can be made in the form of substantially a cylinder that has an outer facing or ply of crinkled paper-like material that is decorated, and which has an inner layer of uncrinkled and uncorrugated fibrous paper-like material, and a corrugated layer of said uncrinkled fibrous paper-like material.

One of the important characteristics of the material is that it will be braced by means of the arched formation of the corrugated and uncorrugated uncrinkled plies, so that the crinkled ply will be held in a smooth curved condition with the crinkles therein of substantially uniform depth and width, and without any decided creases, kinks or offsets therein, at any one point, caused by the bending thereof, in contra-distinction to packing materials such as have been previously used, which have no such characteristics, and which are made up of plies of crinkled material to act as a padding or packing material, and not as a structural material, and which will kink or crease at any point due to the nature of said material. One of the important uses of my material is as a building or structural material for decorative articles and back grounds to be used in window displays, or other advertising displays.

It is another object of my invention to provide a material of the above mentioned character, in which the decorative crinkled ply is provided with decorative means or surface decorations thereon, which are applied in any preferred manner, but which are preferably so applied that the design that it is desired to have on the finished material will be in the proper proportions after crinkling thereof, or even after bending of the crinkled material to the desired curvature, this being taken care of by placing the design on the uncrinkled sheet of paper-like material before crinkling the same, with the design thereon distorted in the direction in which the paper is to be crinkled, or substantially at right angles to the direction in which the crinkles will extend, and undistorted in the direction in which the crinkles will extend, the distortion being sufficient to get the desired undistorted condition of the design in the crinkled condition of the ply when in position on the other plies of the composite material or board, in either a flat or curved condition, as may be desired.

Other objects and advantages of my invention will appear as the description of the drawing proceeds. I desire to have it understood, however, that I do not intend to limit my invention to the particular details shown or described, except as defined in the claims.

In the drawing:

Fig. 1 is a fragmentary perspective view of a portion of a sheet of my improved composite material, showing the plies thereof separated at one end thereof.

Fig. 2 is a sectional view thereof transversely of the corrugations of the corrugated ply, on a greatly enlarged scale.

Fig. 3 is a fragmentary perspective view of a sheet of said material, bent into cylindrical form, to make a decorative article.

Fig. 4 is a fragmentary section, similar to Fig. 2, of the sheet when bent into a curved form such as shown in Fig. 3.

Fig. 5 is a fragmentary view of a sheet of material to be used for the crinkled ply of my composite material.

Fig. 6 is a view thereof after being decorated, and prior to crinkling, and

Fig. 7 is a view of the crinkled sheet after crinkling.

Referring in detail to the drawing, in Fig. 1 is shown a composite board of fibrous material, particularly designed for use for decorative purposes, which comprises an inner corrugated ply 10, and an uncorrugated or plain ply 11, said ply 11 being made up of a normally smooth and flat sheet of fibrous paper-like material, such as is usually used in making ordinary corrugated fiber board, such as strawboard, for example, said corrugated ply 10 being made of similar material to the ply 11.

Said composite sheet of material further comprises a ply 12 of crinkled paper-like sheet material. The ply 11 is secured to the ply 10 by securing the peaks 13 of the corrugations on one side of the corrugated ply 10, to the uncorrugated ply 11 by means of adhesive, indicated at 14, the adhesive being applied in narrow zones or lines, so as to firmly fix the plies 10 and 11 to each other at the peaks 13 of said corrugations. The sheet 11 being under tension at the time that the adhesive is applied, it will be obvious that the sheet 11 braces the corrugations of the corrugated sheet so as to provide an arched formation corresponding to each of the corrugations, the bases of the arched formations being fixed relative to each other. The material in this respect, and in this respect only, is similar to single faced corrugated board. It is, however, not a single faced corrugated board, as it is also provided with the ply 12, but the ply 12 is of such a character that the rigidity of the ordinary double faced corrugated board is not obtained, this rigidity ordinarily preventing any bending of the double faced corrugated board in either a direction crosswise of the corrugations, or lengthwise of the corrugations, and such bending, if done, always causing cracking of the sheet at certain points, thus damaging the same and preventing entirely the bending thereof on a smooth curve, without any damage to the surface of the material. The adhesive used for securing these two plies 10 and 11 together may be the ordinary adhesive used for this purpose, this being ordinarily sodium silicate. However, because of certain advantages found in using a different adhesive than this under certain circumstances for securing the plies 10 and 12 to each other, it may be found desirable to use an adhesive comprising principally starch or a derivative of starch, or a mixture of sodium silicate and starch, as may be found desirable for securing the plies 10 and 12 together, and this same adhesive may also be used for securing the plies 10 and 11 together. While the ply 10 is usually made of strawboard, a kraft board can be used, and while it is also possible to use strawboard for the ply 11, preferably, this ply is made of a jute stock, although a kraft stock can be used, and is probably the most satisfactory, if not found to be too expensive, as, of course, the greater the strength of the plies 10 and 11, the more strength the final product will have and the better it will remain in the shapes to which it may be bent in use.

The ply 12 is preferably 75% folded news stock, (over-issued newspapers), and 25% pure virgin kraft pulp. This has been found particularly desirable, as it is necessary that the ply 12 be made of a material that is of considerable strength, and which will adapt itself to both the coloring and crinkling processes to which it is subjected. For all the purposes mentioned the composition of the ply 12, referred to above, is found to be the most desirable. One of the important characteristics of the composition from which the ply 12 is to be made, is the character of the fiber content thereof. While a short fiber can be used under some circumstances, in one method of crinkling the sheet, this short fiber is not desirable when another crinkling process is used. One of these crinkling processes is known as the wet process, and the short fiber does not adapt itself readily to this wet process. However, if a long fiber content to a considerable degree is present in the composition of the ply 12, then this sheet can be crinkled by either the wet process referred to, or by a dry crinkling process.

In explanation, it might be stated that in the wet process the sheet is run through a vat of hot water prior to passing through the crinkling rolls, and is passed through an even dryer after passing through the crinkling rolls. In the dry process no preliminary wetting or subsequent drying is necessary. While both processes may be used, and it may be found desirable to use both processes because a somewhat different product results from the two processes, the dry process producing a crinkled sheet with a more uniform crinkling thereof, than the wet process, in which the crinkling thereof is more irregular, it is preferred to use a composition for the ply or sheet that is to be crinkled, such that it is adaptable for use with either process, and it has been found that the long fiber of the pure virgin kraft pulp, used in the proportion above described, is particularly desirable in order to provide a ply that is adaptable for either creping or crinkling process, and which also has the desired tensile strength necessary for the ply 12 to carry out its functions in the finished product.

In order to obtain satisfactory results with the use of the crinkled sheet, it is necessary that this crinkled sheet be made of a certain definite weight so as to provide the necessary strength of the ply, and it is also made of the composition referred to above, in order to obtain this strength, with the desired flexibility. It has been found to be the most desirable to make the paper that is to be crinkled, of a weight equal to what is known as a 60 pound weight, or in other words, a weight such that a ream of 24 inch by 36 inch sheets would weight about 60 pounds.

The composite material made up of the plies 10, 11, and 12 is made into the form of a board or sheet of this composite material in a corrugating machine of the usual character, and in the usual manner, except that care must be taken that the heat used in the ironing surface of the machine is not too great, as this has a tendency to parch and withdraw the life from the sheet, making it too brittle for successful use. The heating is done by means of steam, and it has been found that live steam at a pressure of 125 pounds to the square inch heats the ironing surface to substantially the proper temperature. Also the usual amount of tension used in corrugating operations is much too great to be applied to the crinkled sheet, as it would remove the crinkle from the material as it is being formed into a board-like member. Tension that is only sufficient to keep the slack out of the sheet between the roll from which it is being unwound and the contact with the corrugated member, is desirable.

The crinkled sheet 12 is provided with crinkles 15 therein, that, while somewhat irregular in shape, extend all substantially in the same direction and the sheet 12 is applied to the corrugated sheet 10 in such a manner that the crinkles 15 extend parallel, or substantially parallel, to the corrugations of the corrugated sheet 10. The peaks or ridges 16 of the corrugations extending oppositely to the peaks or ridges 13, are secured to the crinkled ply 12 by means of adhesive, indicated at 17 in Fig. 2, and this adhesive extends in narrow zones or strips at spaced intervals, as will be evident from Fig. 2, running lengthwise of the corrugations. Thus the crinkled ply 12 is secured to the corrugated ply 10 in fixed position at spaced intervals, but the crinkled ply 12 is free of the corrugated ply between said points of securement, and has a plurality of the crinkles 15 therein running parallel, or substantially parallel, to the peaks 16 of the corrugations of the corrugated sheet, or in other words, to the zones of securement of the crinkled to the corrugated sheet.

Due to this arrangement, the material can be readily bent into a curved form, such as shown in Fig. 3, in which a sheet of my improved material is shown as being bent or curved into a cylindrical form, with the crinkled ply 12 outward and the uncrinkled or smooth ply 11 inward. While the arched formations created by means of the ply 11 and the corrugated ply 10, have their bases at 13 spaced substantially the same distance apart both when the sheet is flat and curved, there is a very slight decrease in their distance apart when curved, due to the fact that the curved ply 11 (see Fig. 4), slightly reduces the distance between the same, over what it would be when the ply 11 was straight. The corrugations of the ply 10 open out, or the peak portions 16 thereof spread apart to a certain extent due to the curving of the sheet, as will be evident from Fig. 4. When this occurs the crinkles 15 substantially uniformly open or spread out so as to be less sharply defined and less deep. However, the spreading out of these crinkles will be substantially the same throughout the sheet if it is curved on the same radius of curvature throughout, and will present a uniformly crinkled appearance throughout its extent. When the sheet has been curved into the form shown in Figs. 3 and 4, the inner curved or smooth ply 11 will be under no tension, but will be under very slight compression, and the same is, to some extent, true of the corrugated ply 10, while the crinkled ply 12 will be under considerable tension and any compression that might be created in the other two plies would be that due to the tension in the ply 12. This tension existing in the city 12 is due to the fact that the crinkles 15 are tending to assume their normal shape, or that which they have in the flat sheet. This characteristic of the material causes it to be curved substantially uniformly throughout its area when bent into such shape as shown in Fig. 2, rather than at intervals, as is the case with other previously known products that employ corrugated plies and facing plies on both sides thereof, this tendency to kink at certain points causing such double faced corrugated board or material to be damaged, or at least to have an irregular appearance, if any attempt was made to bend it into any curved shape. The smooth uncorrugated ply 11 is just as necessary to accomplish this result as is the crinkled ply 12. It is the two in combination with the corrugated ply 10 that makes this smoothness of the curvature of the sheet possible, as the ply 11 maintains the bases of the arches at 13 in fixed relation, or substantially in fixed relation to each other, whereas if the ply 11 were omitted or were not stiff, as would be true of a creped ply, the material would not maintain any shape at all, but would tend to kink or bend into irregular formations.

In making the crinkled sheet, a sheet of plain paper 12' is utilized, which is shown in Fig. 5. This sheet of paper is then provided with suitable decorative means thereon, which may be applied either by a printing process or by an air brush, or in some similar manner by some coating means. However this may be done, the design 18 is placed thereon in such a manner that it will have the desired appearance when the composite sheet is completed in a flat form or in a curved form. The creping or crinkling of the sheet 12 is done in such a manner that a stretch of at least 33⅓% of the sheet in length is possible. Of course, this is in excess of any actual extension of the ply 12 that is to be made in use, as it is desirable that the crinkled appearance be maintained to a certain extent for its ornamental appearance. However, it can be readily determined as to how the design that is imprinted or otherwise placed on the sheet 12' will appear when the sheet is crinkled and the sheet 12 shown in Fig. 7 is produced.

If it is desired to have the design 18 have a substantially rectangular appearance when the composite sheet is in a flat condition, such as shown in Fig. 2, all that is necessary is to compensate for the difference in dimensions of the sheet in one direction, when printing the design on the sheet 12' prior to crinkling, or in other words, making the design so that it is not rectangular in the uncrinkled sheet, such as shown in Fig. 6, but is made so that the distance from one corner 19 to another corner 19 is greater than from one corner 20 to another corner 20 of the design, the amount that it is greater, if the crinkling takes up 33⅓% of the material, being 33⅓%. If it is desired, however, to have the design assume a rectangular form when in a curved condition, as shown in Fig. 3, the printing of the original design is such that the distance from one corner 19 to another corner 19 of the design is more than 33⅓% greater than from a corner 20 of the design to another corner 20 of the design. A rectangular design, of course, is used merely for purposes of illustration, as the same would be true of any form of design, and if it is known what diameter column, or cylinder, the finished product shown in Fig. 3 is to assume when in its bent condition, this can be readily provided for in the material before crinkling the same. After the design has been applied to the material, it is crinkled by either of the methods referred to above, the crinkles 15 being formed therein and the material having substantially the form which it has when it is incorporated in the composite sheet with the design therein assuming either the exact form that it is desired in a flat sheet, or a form in which it is still slightly distorted so that it will assume the desired form in a sheet that is curved to the final form which it will have in use, or such a curvature, for example, as that shown in Fig. 3.

Of course, it is possible to bend or curve the board in the reverse direction from that shown, which will cause the crinkles to close together more sharply, which makes it possible to provide a concavely curved surface with the decorated crinkled material, should this be desired. However, the preferred manner of using the material is that shown in Fig. 3. While it is obvious that the material could be used for making containers with curved wall portions, it is particularly desirable for use as a decorative material, and particularly so where it is desirable to use similar, or the same material for a background and for curved decorative means, such as cylinders, or columns, or similar members.

The material is not to be confused with a packing material, which is used in place of straw, excelsior, or other wrappings or paddings, as it is not a padding material, nor intended to be, although, of course, it will have a strength at least that single faced corrugated board has when used in containers, and will even have additional strength, and will have more flexibility than double faced corrugated board, and much more stability than single faced corrugated board.

The stability exists due to the fact that the spacing of the points of attachment of the corrugated sheet to the uncorrugated, uncrinkled bracing sheet or ply is substantially fixed, producing a truss-like effect. Also this causes the board to be rigid or substantially so, lengthwise of the corrugations. The arrangement of the crinkles of the crinkled sheet substantially parallel to the corrugations provides for the necessary variation in dimension, of this crinkled sheet, transversely of the corrugations, to permit the curving of the sheet transversely of the corrugations. The resiliency or springiness produced by the crinkling of the material having the tensile strength of the composition used in the crinkled sheet causes the composite board to have a tendency to assume a substantially flat condition, normally, and to curve uniformly when bent into a curved shape. Without the use of the crinkled and uncrinkled plies in the relationship described, these various advantageous characteristics of the composite material, particularly desirable for decorative uses, can not be obtained.

What I claim is:

1. A self-sustaining composite decorative material of the character described, comprising a corrugated paper ply, a smooth plane ply of paper secured to one side of said corrugated ply and a ply of crinkled paper secured to the other side of said corrugated ply, said crinkled ply being provided with a decorated outer surface, said decorated surface having the design thereon arranged to obtain the desired configuration thereof when a predetermined distortion of the crinkled ply due to bending said material in use results.

2. A self-sustaining composite decorative material of the character described, comprising a corrugated paper ply, a smooth plane ply of paper secured to one side of said corrugated ply and a ply of crinkled paper secured to the other side of said corrugated ply, said crinkled ply being provided with a decorated outer surface, said decorated surface having a design imprinted thereon that is distorted in one direction prior to crinkling of said ply.

3. A self-sustaining composite decorative material of the character described, comprising a corrugated paper ply, a smooth plane ply of paper secured to one side of said corrugated ply and a ply of crinkled paper secured to the other side of said corrugated ply, said crinkled paper ply being made of a paper stock having much greater tensile strength and flexibility than the material of said other plies, said plane and crinkled plies cooperating to tension said crinkled ply upon bending said board about said corrugations with said crinkled ply on the convex side of said bend.

4. An article of the character described having a wall portion curved in one direction and comprising an outer ply, having a convex outer surface, that is under tension, a central bent corrugated ply and an inner ply having a substantially smooth uncorrugated concave inner surface, said plies being fixed to each other at intervals, said outer ply being crinkled to permit stretching thereof in the direction of said curvature, said inner ply holding said outer ply under substantially uniform tension in the direction of its curvature.

5. A decorative article of the character described having a wall portion curved in one direction and comprising an outer ply, having a convex outer surface, that is under tension, a central bent corrugated ply and an inner ply having a substantially smooth uncorrugated concave inner surface, said plies being fixed to each other at intervals, said outer ply being crinkled to permit stretching thereof in the direction of said curvature, and having a decorated outer surface, said inner ply holding said outer ply under substantially uniform tension in the direction of its curvature.

6. A self-sustaining composite decorative material of the character described, comprising a corrugated paper ply, a smooth plane ply of paper secured to one side of said corrugated ply and a ply of decorative crinkled paper secured to the other side of said corrugated ply, said crinkled ply and said plane ply cooperating with each other and with said corrugated ply to control the tensioning of said crinkled ply by means of said plane ply upon bending said composite material about an axis substantially parallel to the length of the corrugations of said corrugated ply.

7. A self-sustaining composite decorative material of the character described, comprising a corrugated paper ply, a smooth plane ply of paper secured to one side of said corrugated ply and a ply of decorative crinkled paper secured to the other side of said corrugated ply, with the crinkles therein extending substantially parallel to the corrugations of said corrugated ply, said plane and crinkled plies cooperating to cause said composite material to have a tendency to straighten out upon being bent about an axis substantially parallel to the said crinkles, and the corrugations of said corrugated ply.

8. A self-sustaining composite decorative board including a corrugated inner ply of paper, a plane sheet of paper fixed to the corrugations of said inner ply at one side thereof, and a sheet of paper fixed to the corrugations at the opposite side of said inner ply and having crinkles extending only substantially longitudinally of the corrugations, said plane and crinkled plies cooperating to tension said crinkled ply upon bending said board about said corrugations with said crinkled ply on the convex side of said bend.

9. A self-sustaining composite decorative material of the character described, comprising a corrugated paper ply, a smooth plane ply of paper secured to one side of said corrugated ply and a ply of crinkled paper secured to the other side of said corrugated ply, said crinkled ply being provided with crinkles of such character as to permit a limited stretching of said crinkled ply without damage thereto or to the said composite material in a direction transverse to the corrugations of said corrugated ply, said plane ply and said crinkled ply cooperating to hold said composite material bent upon a smooth curve upon bending said material in a direction transverse to said corrugations.

10. A self-sustaining composite decorative material of the character described, comprising a corrugated paper ply, a smooth plane ply of paper secured to one side of said corrugated ply and a ply of crinkled paper secured to the other side of said corrugated ply, said crinkled ply being provided with crinkles of such character as to permit said crinkled ply to extend itself as much as one-third its normal length without damage to said composite material upon bending said composite material in a direction transverse to the corrugations of said corrugated ply, said plane ply and said crinkled ply cooperating to hold said composite material bent upon a smooth curve upon bending said material in a direction transverse to said corrugations.

11. A self-sustaining composite decorative material of the character described, comprising a corrugated paper ply, a smooth plane ply of paper secured to one side of said corrugated ply and a ply of crinkled paper secured to the other side of said corrugated ply, said crinkled ply being provided with crinkles of such character as to permit said crinkled ply to extend itself a limited amount without damage to said composite material upon bending said composite material in a direction transverse to the corrugations of said corrugated ply, said plane ply and said crinkled ply cooperating to hold said composite material bent upon a smooth curve upon bending said material in a direction transverse to said corrugations, said crinkled ply being provided with a decorative surface coating.

12. As a new article of manufacture, a composite board consisting of a corrugated inner sheet, a crepe sheet secured to the peaks at one side of the corrugated sheet and having crinkles extending parallel to the corrugations to form surplus material in said crepe sheet to provide for difference in curvature in said sheets upon curving thereof in the longitudinal direction of the corrugations, and a plane sheet fixed to the peaks at the opposite side of said corrugated sheet for fixedly spacing said corrugations and preventing stretching of said corrugated sheet in a direction transversely of said corrugations when the sheets are curved.

FRED GEORGE.